United States Patent
Baker et al.

(10) Patent No.: US 11,397,717 B2
(45) Date of Patent: Jul. 26, 2022

(54) DATA STORAGE SYSTEM AND METHOD

(71) Applicant: Palantir Technologies Inc., Palo Alto, CA (US)

(72) Inventors: James Baker, London (GB); Robert Kruszewski, London (GB); Ovidiu-Dan Sanduleac, London (GB)

(73) Assignee: Palantir Technologies, Inc., Denver, CO (US)

( * ) Notice: Subject to any disclaimer, the term of this patent is extended or adjusted under 35 U.S.C. 154(b) by 178 days.

(21) Appl. No.: 16/100,538

(22) Filed: Aug. 10, 2018

(65) Prior Publication Data

US 2019/0354616 A1    Nov. 21, 2019

(30) Foreign Application Priority Data

May 15, 2018 (GB) .................................... 1807877

(51) Int. Cl.
*G06F 16/23*    (2019.01)
*G06F 16/27*    (2019.01)

(52) U.S. Cl.
CPC ...... *G06F 16/2358* (2019.01); *G06F 16/2379* (2019.01); *G06F 16/273* (2019.01)

(58) Field of Classification Search
CPC . G06F 16/2358; G06F 16/273; G06F 16/2379
See application file for complete search history.

(56) References Cited

U.S. PATENT DOCUMENTS

| | | | |
|---|---|---|---|
| 5,481,722 A | 1/1996 | Skinner | |
| 5,745,906 A * | 4/1998 | Squibb | .................... G06F 16/10 |
| 5,893,119 A * | 4/1999 | Squibb | .................... G06F 16/10 |
| 2002/0169740 A1* | 11/2002 | Korn | ................... G06F 16/1756 |

(Continued)

FOREIGN PATENT DOCUMENTS

| | | |
|---|---|---|
| EP | 0981099 | 2/2000 |
| EP | 3570168 | 11/2019 |

OTHER PUBLICATIONS

Official Communication for European Patent Application No. 18188545.0 dated Oct. 26, 2018.

(Continued)

*Primary Examiner* — Tony Mahmoudi
*Assistant Examiner* — Umar Mian
(74) *Attorney, Agent, or Firm* — Knobbe Martens Olson & Bear, LLP

(57) ABSTRACT

Data item deltas are generated for each of M updates of a plurality of updates, wherein M is greater than or equal to one, and a first first-level combined delta is generated representing N updates of the plurality of updates, wherein N is greater than M, and the N updates comprise the M updates and O=N–M other updates. A first second-level combined delta is generated representing J updates of the plurality of updates, wherein J is greater than N, and the J updates comprise the N updates and K other updates of the plurality of updates, wherein K=J–N. The deltas, the first first-level combined delta and the first second-level combined delta are stored for enabling subsequent reading of at least part of the data by accessing the data item, the first first-level combined delta and the first second-level combined delta.

19 Claims, 6 Drawing Sheets

(56) References Cited

U.S. PATENT DOCUMENTS

| | | | | |
|---|---|---|---|---|
| 2010/0235335 A1* | 9/2010 | Hernan | ................... | G06F 16/23 |
| | | | | 707/703 |
| 2011/0252004 A1* | 10/2011 | Sim-Tang | ............. | G06F 16/174 |
| | | | | 707/674 |
| 2013/0218840 A1* | 8/2013 | Smith | ................ | G06F 11/1662 |
| | | | | 707/639 |
| 2013/0290282 A1* | 10/2013 | Faerber | .............. | G06F 16/1744 |
| | | | | 707/693 |
| 2014/0019698 A1* | 1/2014 | Pittelko | ................ | G06F 3/0619 |
| | | | | 711/162 |
| 2014/0136498 A1* | 5/2014 | Finis | .................... | G06F 16/219 |
| | | | | 707/695 |

OTHER PUBLICATIONS

Liu et al.: "Maintaining large update batches by restructuring and grouping", Information Syst, Pergamon Press, Oxford, GB, vol. 32, No. 4, Feb. 14, 2007, pp. 621-639, ISSN: 0306-4379.

Official Communication for European Patent Application No. 18188545.0 dated Feb. 26, 2021, 9 pages.

* cited by examiner

DATA STORAGE SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The subject innovations relate to methods and systems for providing efficient data storage and retrieval.

Description of the Related Art

It is often desirable to store data in the form of an initial snapshot and a series of updates to the initial snapshot. By storing the data in this form, the state of the data at any point may be recovered. However, recovering data from such a snapshot and series of updates uses a substantial amount of computational resources. Systems for recovering the state of the data at a given point often require applying each of a potentially great number of updates in turn. In some scenarios, applying each of the updates in turn is computationally wasteful as later updates may render earlier updates moot, e.g. a later update may delete data updated by an earlier update.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A first aspect of the specification provides a method, performed by one or more processors, the method comprising: receiving data; storing a data item corresponding to the data; receiving a plurality of updates to the data; generating corresponding deltas for each of M updates of the plurality of updates, wherein M is greater than or equal to one; generating a first first-level combined delta representing N updates of the plurality of updates, wherein N is greater than M, and the N updates comprise the M updates and $O=N-M$ other updates; generating a first second-level combined delta representing J updates of the plurality of updates, wherein J is greater than N, and the J updates comprise the N updates and K other updates of the plurality of updates, wherein $K=J-N$; and storing the deltas, the first first-level combined delta and the first second-level combined delta for enabling subsequent reading of at least part of the data by accessing the data item, the first first-level combined delta and the first second-level combined delta.

The number of updates represented by the first second-level combined delta, J, may be equal to $I \times N$, where I is a positive integer greater than one.

The method may comprise generating $I-1$ first-level combined deltas, each representing a distinct set of N updates of the M updates, and storing the $I-1$ first-level combined deltas.

The total number of generated first-level combined deltas, I, may be equal to N.

The number of updates represented by the second-level combined delta may be $N^2$ when the number of updates represented by the first second-level combined delta is $I \times N$ and the total number of generated first-level combined deltas, I, is equal to N.

The data item, the deltas, the first-level combined deltas and the second-level combined deltas may each comprise indexed data. Indexed data comprising one or more indexed elements.

The storing of deltas, the first first-level combined delta and the first second-level combined delta may be to a distributed data management system.

The distributed data management system may be a token ring database system. The token ring database system may allocate each element stored to the token ring database system to a given database server randomly or pseudo-randomly.

Each of the data item, the deltas, the first-level combined deltas and the second-level comprised deltas may comprise a plurality of fragments. Each of the fragments may have a fixed sized limit. Each fragment may be stored to the token ring database system as a distinct element.

A B+ tree indicating the fragment in which any given indexed element contained in the respective data item, delta or combined delta may be stored for each data item, delta, first-level combined delta, and second-level combined delta.

The distributed data management system may comprise a transaction manager.

The plurality of updates may be an ordered sequence of updates and each combined delta may represent a continuous portion of the ordered sequence of updates.

The method may comprise generating deltas representing each update of a subset of the plurality of updates. The subset of the plurality of updates may comprise each update for which the respective update is not the final update of a combined delta.

The method may comprise: retrieving at least a portion of the data item; determining a set of the deltas and/or combined deltas representing A updates, wherein the determined set is a minimal set of the deltas and/or combined deltas that represent the A updates; retrieving at least respective portions of each of the determined set of deltas and/or combined deltas; reconstituting at least a respective portion of the data from the at least a portion of the data item; updating the at least a portion of the data based on the retrieved at least respective portions of each of the determined set of deltas and/or combined deltas; sending the updated data.

The expectancy of the number of elements in a minimal set of deltas and/or combined deltas representing B updates may be $O(\log B)$.

The number of elements in a minimal set of deltas and/or combined deltas may be $O(\log B)$.

A second aspect of the specification provides a method, performed by one or more processors, comprising: retrieving at least a portion of a data item representing at least a portion of data; determining a set of deltas and/or combined deltas representing A updates of the plurality of updates, wherein the determined set is a minimal set of the deltas and/or combined deltas that represent A updates; retrieving at least respective portions of each of the determined set of deltas and/or combined deltas; reconstituting the at least a portion of the data from the at least a portion of the data item; updating the at least a portion of the data based on the retrieved at least respective portions of each of the determined set of deltas and/or combined deltas; sending the updated data.

The expectancy of the number of elements in the minimal set of deltas and/or combined deltas representing B updates may be O(log B).

The number of elements in the minimal set of deltas and/or combined deltas may be O(log B).

A third aspect of the specification provides a computer program, optionally stored on a computer-readable medium comprising instructions which when executed by a computer cause the computer to carry out any method above.

A fourth aspect of the specification provides a data processing apparatus configured to carry out any method above. The data processing apparatus may comprise one or more processors or special-purpose computing hardware.

A fifth aspect of the specification provides a system configured to carry out any method above.

BRIEF DESCRIPTION OF THE DRAWINGS

The features of the subject innovations are set forth in the appended claims. However, for the purpose of explanation, several aspects of the disclosed subject matter are set forth in the following figures.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to methods and systems for providing efficient data storage and retrieval. These methods and systems provide mechanisms for storing data and a series of updates as a series of deltas and combined deltas. These methods and systems enable the state of data after several updates to be found by combining a minimal number of deltas and combined deltas. Combining a minimal number of deltas and combined deltas uses considerably less computational resources than combining a larger number of smaller deltas.

Example Computer System

Figure 1:
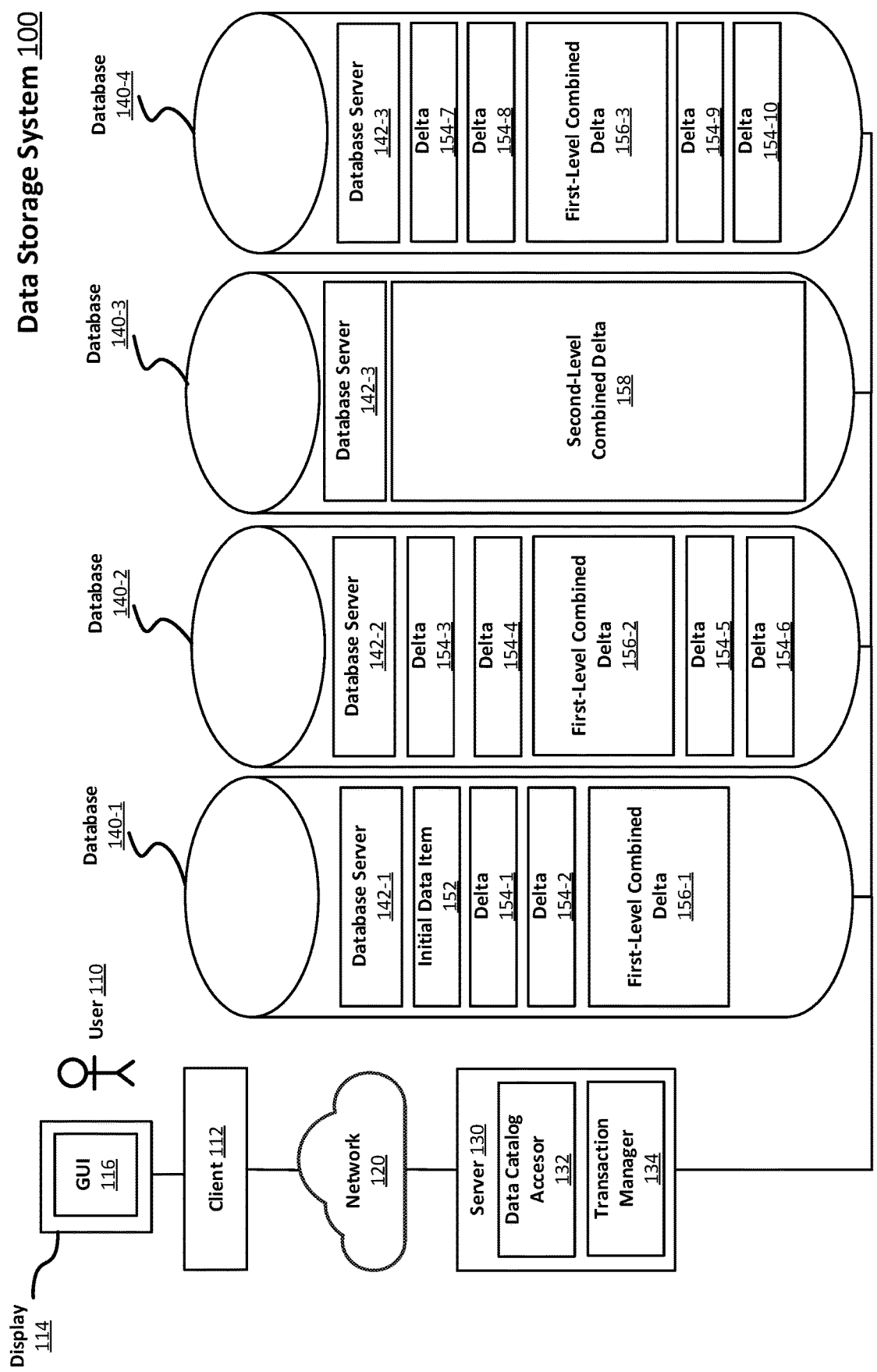
FIG. 1 is a block diagram illustrating an example of a computer system configured to store and retrieve data, in accordance with example embodiments.

FIG. 1 illustrates an example of a computer system 100 configured to perform extraction. As shown, the computer system 100 includes a client computing device 112 used by a human user 110, a server 130 and databases 140-1, 140-2, 140-3, 140-4. The client computing device 112 and the server 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of computing device 500 described below with respect to FIG. 6. The client computing device 112 may also include a web browser or a client application configured to display, in a graphical user interface 116 of the client computing device 112, a computer program for accessing data. It may also allow the user to specify other operations that should be performed by the sever 130. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server 130 may be implemented as a single server computing device or as multiple server computing devices arranged in a distributed or clustered computing arrangement. Each such server computing device may be composed of hardware components like those of computing device 500 described below with respect to FIG. 6. The server 130 includes a data catalog accessor 132 and a transaction manager 134.

The server 130 may include one or more processors (e.g., CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the data catalog accessor 132 and the transaction manager 134.

The data catalog accessor 132 receives instructions for data storage and retrieval from the client computing device 112, and forwards these instructions to the transaction manager 134. The data catalog accessor 132 receives the instructions from the client 112 using any suitable mechanism, e.g. a remote procedure call (RPC), a Representational State Transfer (REST) service call or a message queue event. These received instructions contain details of the data to be stored, deleted, updated and/or retrieved. In the case of data storage and updating, the data to be stored or updated is either included in the instruction or retrieved by the data catalog accessor in a subsequent operation. The data catalog accessor 132 transforms the instructions and included or retrieved data in to a format understandable by the transaction manager 134, and then communicates the transformed instructions and data to the transaction manager 134 using any suitable mechanism. For example, the data catalog accessor 132 communicates the transformed instructions and data via a function call, a remote procedure call (RPC), a REST service call, a message queue, or interprocess communication (IPC). On completion of the instruction, if data is returned, e.g. in the case of a data retrieval operation, the data may be returned by any of these same mechanisms.

The transaction manager 134 accesses (e.g., receives) the transformed instructions and/or data. On receiving the transformed instructions and data, the transaction manager 134 determines if data needs to be stored and, if so, whether the data should be stored as a data item 152, a delta 154, a first-level combined delta 156, a second-level combined delta 158 or a higher level combined delta. In a typical embodiment, the data item 152 is in the same format as the delta 154, because a data item (e.g., even an "initial" data item) may be conceived as a delta between the data item and nothing. Based on data stored in computer-readable media of the server 130 and/or stored in the databases 140 and the received data, the transaction manager 134 creates a data object such as a data item 152, a delta 154, a first-level combined delta 156, a second-level combined delta 158 and/or a higher level combined delta. Then, the transaction manager 134 stores the created data item in one or more of the databases 140. While each data item, delta and combined delta is shown as residing on a single database server, each may be distributed across a number of databases, e.g. different fragments of a single item, delta or combined delta may be stored on different databases. These operations are performed according to a suitable method, e.g. example method 200 with respect to FIG. 2.

The transaction manager 134 is also responsible for retrieving and reading updated data from the databases 140. On receiving an instruction to read data after a given number of updates, the transaction manager 134 retrieves the data item 152, and the appropriate deltas 154 and/or combined deltas 156, 158 from the databases 140. The transaction manager 134 proceeds to apply the updates represented by the deltas and/or combined deltas, to the data item. The transaction manager 134 then returns the updated data to the data catalog accessor 132. In many embodiments, a portion of these are retrieved according to the received instruction. Likewise, a respective portion of the deltas and combined deltas are applied to the respective portion of the data item. Retrieving and reading updated data is performed according to a suitable method, e.g. example method 300 with respect to FIG. 3.

The transaction manager 134 also manages transactions. A transaction is a unit of work, e.g. one or more update, read, deletion and/or write operations, to be performed by a data management system. The data contained in a transaction may correspond to a portion of a data object, a single data object or a plurality of data objects. For example, the data management system is a system comprising the server 130 and the databases 140. While individual database servers 140 can provide transactions, using the transaction manager 134 enables transactions to be implemented across a distributed database system with a plurality of databases 142.

Transactions enable recovery from failures by ensuring the data management system is kept consistent when failures occur. Transactions also ensure the data management system is kept consistent when multiple programs attempt to access the data management system simultaneously. This is achieved by four properties of transactions known as ACID: Atomicity, Consistency, Isolation and Durability.

Atomicity refers to transactions being "all-or-nothing", or atomic, meaning that a transaction either completely succeeds or fails. If a transaction succeeds, all operations included in the transaction are completed. If a transaction fails, no visible change is made to the data management system, so it appears to external systems, such as the client 112, accessing the system after the transaction has failed that no operation has been attempted. Transaction failure may occur for a number of reasons, e.g. power failure, faulty code or application failure.

Consistency refers to (successful) transactions only changing data stored by the data management system in allowed ways. The allowed ways that the database can change may be constrained by any number of primary key constraints, data type constraints, foreign key constraints, unique constraints and assertion statements. If a transaction results in a state that violates any of these constraints, the transaction is not successful and results in a transaction failure, so it is as if no operation has been attempted.

Isolation refers to work taking place inside a transaction being invisible to other operations, e.g. other transactions, running concurrently. This property ensures data is only seen in a consistent state, e.g. before or after a transaction has completed. Without isolation, data read by a second transaction while a first transaction was underway would be incorrect. For example, the first transaction may represent a bank transfer and so increment one bank balance then decrement another bank balance. If a second transaction was able to read these bank balances half-way through the first transaction, the first bank balance would be incremented but the second bank balance would not yet be decremented. It would, therefore, appear to the second transaction that money had appeared from nowhere. Isolation prevents these scenarios from occurring.

Durability refers to all successful transactions being permanently stored, e.g. stored in non-volatile memory, e.g. to a hard disk drive or solid state drive. The transaction is not considered successful until this has occurred, and if this is prevented from occurring, e.g. by a disk failure, the transaction is deemed to have failed, and no visible change is made to the data management system.

Each of the databases 140 may include one or more processors (e.g., CPUs), a network interface, and memory. The processor(s) may be configured to execute computer instructions that are stored in one or more computer-readable media, for example, the memory of each database 140. The databases 140 may each include network interface that are configured to allow each database 140 to transmit and receive data in one or more networks, e.g., a network connecting the server 130 and the databases 140, which may be the same or different network as the network that connects the server 130 and the client 112. The network interface may include one or more network interface cards (NICs). The memory of each database 140 may store data or instructions. The instructions stored in each memory may include a database server module 142. While four databases 140 are shown, any number of databases may be used.

The database servers 142 may be any database serving application capable of providing reliable storage. In many embodiments, the database servers 142 are the same database serving application, but this is not essential provided all can be accessed and managed by the transaction manager 134. One or more of the database servers 142 may be a key-value store, such as CassandraDB, Oracle NoSQL or LevelDB. One or more of the database servers 142 may be a document-oriented database, such as MongoDB or CouchDB. One or more of the database servers 142 may be a Structured Query Language (SQL) database such as Oracle® database, MySQL database, PostgreSQL database or Microsoft® SQL server.

In many embodiments, the database servers 142 are distributed database serving applications, e.g. CassandraDB or MongoDB. This is not as essential as distributed data management may be provided by the transaction manager 134. However, using a distributed database serving application enables fault tolerance and/or horizontal scalability, and the transaction manager 134 need only provide the distributed transaction functionality.

Example Storage Method

Figure 2:
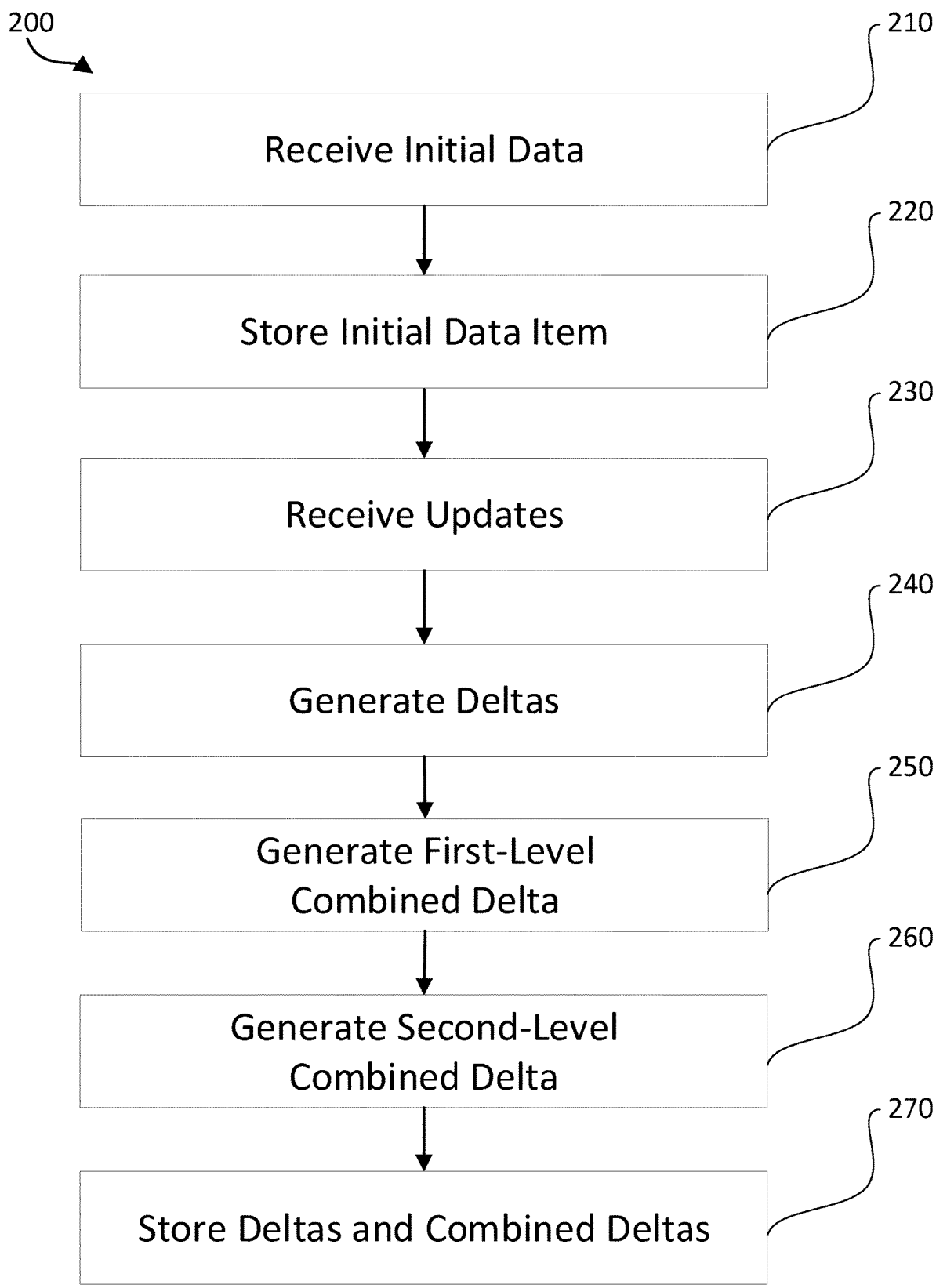
FIG. 2 is a flow diagram illustrating an example method for storing representations of updated data, in accordance with example embodiments.

FIG. 2 is a flowchart illustrating an example method 200 by which data storage is provided. The method 200 is performed by computer-readable instructions, e.g. software, for execution by one or more processors of one or more computing devices (e.g., the computing device 500 of FIG. 6). In one embodiment, the one or more computing devices are the server 130 and the database servers 140. It should be understood that any of the operations indicated by this Figure may be omitted and may be performed in a different order to that indicated. It should also be noted that these operations may be interleaved or iterated. In particular, a single update could be received at each interval and a delta generated, until a threshold number of deltas is reached, at which point a first-level combined delta is generated. When a second threshold number of deltas and first-level combined deltas is reach, a second-level combined delta is generated.

Operation 210 receives the data. The data is received by way of any suitable mechanism. The data may be actively retrieved, e.g. by querying a database, accessing a REST endpoint, accessing a file or making a remote procedure call, and/or passively received, for example, as one or more network packets, service calls, file transfers or events. The received data may be in any suitable format, e.g. a file, raw database data, binary data, text data, JavaScript Object Notation (JSON) data, or Extensible Markup Language (XML) data. In some cases, the received data comprises a plurality of data objects, e.g. database rows, text data objects, files, JSON data objects or XML data objects. Associated metadata may be received with the data item. Examples of associated metadata are: filenames, XML schemas, JSON schemas, dates, times and data type information.

Operation 220 stores a data item representing the data. The data item may be stored in any appropriate data storage system, e.g. a database or a file storage system. In some embodiments, the data storage system is a distributed database system comprising multiple databases (e.g. databases 140). The distributed database system stores the data item (e.g. 152) on one or more of the databases (e.g. database 142-1).

The data item may be in the same format as the data. It may also be a compressed representation of the data, e.g. compressed using a redundancy reducing method provided by a database system. It may also be a transformation of the data. Examples of such transformations include: converting the data in to a format suitable for storage in the database; changing the endianness of the data; and removing extraneous data. In some embodiments, the data item may comprise a B+ tree representing at least a portion of the data.

Operation 230 receives a plurality of updates to the data. These updates are received using any suitable mechanism. The updates may be actively retrieved, e.g. by querying a database, accessing a REST endpoint, accessing a file or making a remote procedure call, and/or passively received, for example, as one or more network packets, service calls, file transfers or events. The updates may be in any suitable format, e.g. a file, raw database data, binary data, text data, JavaScript Object Notation (JSON) data, or Extensible Markup Language (XML) data. In some cases, each update comprises a plurality of data objects, e.g. database rows, text data objects, files, JSON data objects or XML data objects. Associated metadata may be received with the data item. Examples of associated metadata are: filenames, XML schemas, JSON schemas, dates, times and data type information.

The updates comprise data and/or data changing instructions. Each update may comprise any of new data to store, new values for updating existing data or an instruction to remove existing data. In some embodiments, the updates are sequential, e.g. each update is configured to be applied subsequent to the previous updates in the sequence. In these embodiments, each of these updates may be received in turn. In other embodiments, all updates are defined with respect to the data item and may be applied in any order.

Operation 240 generates corresponding deltas representing each of at least M updates of the plurality of updates, where M is a number greater than or equal to one. These deltas may be in any form sufficient to adequately represent the update. In the case of new data to be stored, the delta may comprise the new data, or a suitable compression and/or transformation of the new data. In the case of a change to existing data, the delta may comprise a difference between the previous state of the data and the updated state of the data, or a transformation and/or compression of this difference. In the case of deletion of existing data, the delta may be any indication of the data to be deleted, e.g. a list of filenames or other identifiers. A single delta may comprise data and/or instructions for any combination of new data to be stored, changes to existing data and deletion of existing data.

Operation 250 generates a first-level combined delta representing N updates, where N is greater than M. The first-level combined delta represents the M updates and O other updates, where O=N−M. The first-level combined delta may comprise data and/or instructions for any combination of new data to be stored, changes to existing data and deletion of existing data. These may take the same format as described for the deltas. If one or some portion of one of the N updates renders another one or some portion of one of the N updates moot, the first-level combined delta may account for this by not representing these updates or portions of updates in the first-level combined delta. The first-level combined delta may, therefore, be smaller, e.g. require less memory to store, than deltas separately representing each of the N updates.

Operation 260 generates a second-level combined delta representing J updates of the plurality of updates, where J is greater than N. The second-level combined delta represents the J updates and K other updates, where K=J−N. The second-level combined delta may comprise data and/or instructions for any combination of new data to be stored, changes to existing data and deletion of existing data. These may take the same format as described for the deltas. If one or some portion of one of the J updates renders another one or some portion of one of the J updates moot, the second-level combined delta may account for this by not representing these updates or portions of updates in the second-level combined delta. The second-level combined delta may, therefore, be smaller, e.g. require less memory to store, than deltas separately representing each of the J updates.

The number of updates, J, represented by the second-level combined delta may be a multiple of N, the number of updates represented by the first-level combined delta, i.e J=I×N where I is a positive integer greater than one. I−1 first-level combined deltas may be generated, including that generated at operation 240. Each of these first-level combined deltas represents a distinct set of N updates of the J updates. In some embodiments 1=N and so J=N², e.g. the first-level combined delta(s) each represent N updates and the second-level combined delta(s) each represent N² updates.

While, for the sake of clarity, the above has been described with respect to first-level combined deltas and second-level combined deltas. It should be appreciated that there may be any number of levels of combined deltas with each greater level of combined deltas representing more updates than the last. For example, where first-level combined deltas represent N updates and second-level combined deltas represent N² updates, the third-level combined deltas may represent N³ updates and the Z-level combined deltas may represent $N^Z$ updates, where Z is any positive integer.

In embodiments where the updates are an ordered sequence of updates, e.g. the updates are sequential and configured to be applied in turn; each combined delta may represent a continuous portion of the ordered sequence of updates. For example, the first first-level combined delta may represent updates 1 to N, the second first-level combined delta may represent updates N+1 to 2N, etc. Likewise, the first second-level combined delta may represent updates 1 to N² and the second second-level combined delta may represent updates N²+1 to 2N², etc. Generalising, the first Z-level combined delta may represent updates 1 to $N^Z$ and the second Z-level combined delta may represent updates $N^z+1$ to $2N^z$.

In such embodiments, a corresponding delta representing each update of a subset of the plurality of updates may be generated, wherein the subset of the plurality of updates comprises each update for which the respective update is not the final update of a combined delta. The purpose of this is to ensure that the state of the data after any number of updates is applied may be derived from a number of deltas and combined deltas. For example, if N=4 then the state of the data after 6 updates may be derived using the first first-level combined delta, the delta for update five and the delta for update six.

Operation 270 stores the deltas and combined deltas in any appropriate data storage system, e.g. a database or a file storage system. In some embodiments, the data storage system is a distributed database system comprising multiple databases (e.g. databases 140). The distributed database system stores the deltas and combined deltas (e.g. 154, 156, 158) on one or more of the databases (e.g. database 142-1).

The deltas and combined deltas may be stored in the same format as they are generated. Alternatively, a compressed representation of the deltas and combined deltas may be stored, e.g. compressed using a redundancy reducing method provided by a database system. A transformed representation of the deltas and/or combined deltas may be stored. Examples of such transformations include: converting data in to a format suitable for storage in the database; changing the endianness of the data; and removing extraneous data.

For the sake of clarity, the examples above refer to each first-level combined delta representing a fixed number of updates, each second-level combined delta representing a fixed number of updates and each Z-level combined delta representing a fixed number of updates. However, it should be noted that in some embodiments this may not be the case. For example, the number of updates represented by a particular first-level combined delta may be chosen within a given range at random or according to a given formula. The same applies for the number of updates represented by a particular second-level combined delta or Z-level combined delta.

Example Retrieval Method

Figure 3:
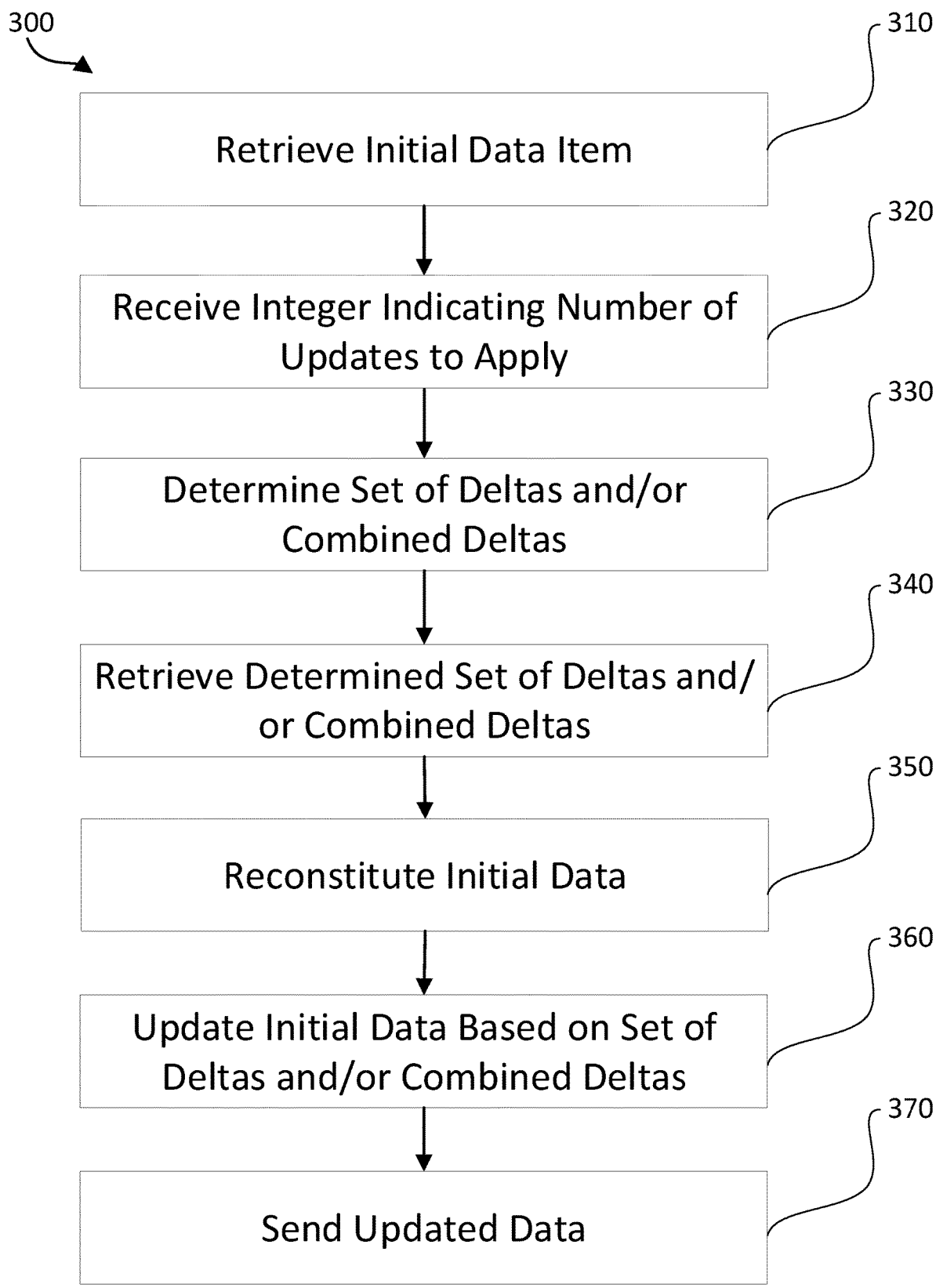
FIG. 3 is a flow diagram illustrating an example method for retrieving updated data from the stored representations of the updated data, in accordance with example embodiments.

FIG. 3 is a flowchart illustrating an example method 300 by which retrieval of sequentially updated data stored according to embodiments of example method 200 is provided. The method 300 is performed by computer-readable instructions, e.g. software, for execution by one or more processors of one or more computing devices (e.g., the computing device 500 of FIG. 6). In one embodiment, the one or more computing devices are the server 130 and the database servers 140. It should be understood that any of the operations indicated by this Figure may be omitted and may be performed in a different order to that indicated. It should also be noted that these operations may be interleaved or iterated.

Operation 310 retrieves a data item or a portion of a data item. The data item, or portion thereof, is retrieved by any suitable method, e.g. querying a database, accessing a REST endpoint, accessing a file or making a remote procedure call. The retrieved data item, or portion thereof, may be in any suitable format, e.g. a file, raw database data, binary data, text data, JavaScript Object Notation (JSON) data, or Extensible Markup Language (XML) data. In some cases, the retrieved data item comprises a plurality of data objects, e.g. database rows, text data objects, files, JSON data objects or XML data objects. Associated metadata may be retrieved with the data item. Examples of associated metadata are: filenames, XML schemas, JSON schemas, dates, times and data type information. The retrieved data item may comprise a B+ tree data structure.

Operation 320 determines a minimal set of deltas and/or combined deltas that represents all updates up to and including an $A^{th}$ update. The set may be found by: determining the highest combined delta level for which the number of updates represented by combined deltas at that level is less than A; selecting the combined deltas at that level which represent updates before and up to the $A^{th}$ update; selecting the combined deltas, if any, at the combined delta level below which represent updates after those represented by combined deltas at the level above but before and up to the $A^{th}$ update; selecting combined deltas, if any, after those represented by combined deltas at the levels above but before and up to the $A^{th}$ update in turn for each lower level of combined deltas until the lowest combined delta level is reached; and selecting deltas before and up to the $A^{th}$ delta for each update not represented by a combined delta at any level.

Where each combined delta level represents a fixed number of updates and this fixed number of updates is an exact multiple of the level below, the number of combined deltas and/or deltas at each level in the determined minimal set is:

$$D_n = \left\lfloor \frac{A}{c_n} \right\rfloor$$

$$D_{n-1} = \left\lfloor \frac{A - c_n D_n}{c_{n-1}} \right\rfloor$$

$$D_{n-2} = \left\lfloor \frac{A - c_n D_n - c_{n-1} D_{n-1}}{c_{n-2}} \right\rfloor$$

$$\vdots$$

-continued
$$D_0 = \left\lfloor \frac{A - c_n D_n - c_{n-1} D_{n-2} - \ldots - c_1 D_1}{c_0} \right\rfloor$$

where $D_k$ is the number of combined deltas at a given level k, $c_k$ is the number of updates represented by a combined delta at a given level k. $D_0$ is the number of non-combined deltas, e.g. those representing only a single update in the determined minimal set, so $c_0=1$. Therefore, the total number of deltas and/or combined deltas, T, in the determined minimal set is:

$$T = \sum_{k=0}^{n} D_k$$

When calculated according to the equations above T=O (log A). This means that the number of deltas and/or combined deltas in the determined minimal set will grow logarithmically with the number of updates, A, which is particularly beneficial when A is large. For example, representing 10000 updates would require O(log 1000) α 3 times as many combined deltas and deltas than the number required to represent 10 updates. If the size of the determined set grew linearly with the number of updates, representing 10000 updates would require O(1000) α 1000 times as many combined deltas than the number required to represent 10 updates.

In some embodiments, each delta at the $k^{th}$-level represents $C^k$ updates, where C is a constant. In these embodiments, the above may be framed as follows.

Given A total updates that need to be represented, every C updates, a first-level combined delta representing the information in those updates is created. Every $C^2$ updates, a second-level combined delta representing the information in those updates is created. Generalizing, every $C^k$ updates, a the $k^{th}$-level delta representing the information in those updates is created. Using this scheme, the contents of every update is guaranteed to exist in exactly one combined delta at each level.

For A updates, there will be A/C first-level combined deltas, $A/C^2$ second-level combined deltas, . . . , and $A/C^k$ $k^{th}$-level combined deltas. Given A updates, the maximum level of combined deltas is the greatest x for which $C^x \leq A$, or rather, x log C≤log A, so the number of levels is logarithmic since C is a constant.

It follows that the number of deltas and combined deltas needed to represent A updates is also logarithmic. There is guaranteed to be at least one combined delta of size $C^x$ for some maximal x that is less than A, of which it can divide A at most C times, because otherwise that x would not be maximal. When the updates represented by these $x^{th}$-level combined deltas are accounted for, there are at most $C^x-1$ updates remaining to be represented by lower-level combined deltas and deltas, because otherwise x would not be maximal. Therefore, at most xC combined deltas and deltas are required to represent A updates, where x grows logarithmically and C is constant, so at most a logarithmic number of deltas and combined deltas are required to represent A updates.

In some embodiments, width data for each of at least a portion of the combined deltas has been stored. The width data indicates the number of updates represented by the respective combined delta. The width data may have been stored with the respective combined deltas or stored in a separate data store, such as a hash table or database. In these embodiments, the width of the combined deltas is used to determine the set of deltas and combined deltas. The widths of the combined deltas may have been chosen (pseudo)-randomly according to a given probability distribution. In these cases, the number of deltas and combined deltas needed to represent A updates may not be guaranteed to be of O(log A), but for many probability distributions the expected value of deltas and combined deltas needed to represent A updates is O(log A). For example, this would be the case for a uniform probability distribution which causes each level of combined deltas represents between one more than and three times as many as updates as the level of combined deltas below it.

Using a determined set of deltas and/or combined deltas guaranteed, or expected, to have a size of O(log A) is advantageous. With a small set of combined deltas and/or deltas, considerably less computing resources are required to perform at least operations 330 and 350 of this method than would be required were a larger number, e.g. O(A), of deltas and/or combined deltas used.

Operation 339 retrieves the determined set of deltas and/or combined deltas, or portions of the determined set of deltas and/or combined deltas where the portions correspond to updates to the portion of the data item retrieved. The set of deltas and/or combined deltas, or set of portions thereof, is retrieved by any suitable method, e.g. querying a database, accessing a REST endpoint, accessing a file or making a remote procedure call. Each of the retrieved deltas and/or combined deltas, or portions thereof, may be in any suitable format, e.g. a file, raw database data, binary data, text data, JavaScript Object Notation (JSON) data, or Extensible Markup Language (XML) data. In some embodiments, each of the retrieved deltas and/or combined deltas, or portions thereof, comprises a plurality of data objects, e.g. database rows, text data objects, files, JSON data objects or XML data objects. Associated metadata may be retrieved with the deltas and/or combined deltas. Examples of associated metadata are: filenames, XML schemas, JSON schemas, dates, times and data type information.

Operation 340 reconstitutes the data, or the portion thereof, from the retrieved data item. The data may be in the same format as the data item, and so require no reconstitution operations. If the data item, or portion of, is a compressed representation of the data, reconstituting the data may comprise decompressing the data. If the data item or portion therefore, is a transformed representation of the data, reconstituting the data may comprise performing an inverse transformation.

Operation 350 updates the data, or portion thereof, based on the retrieved set of deltas and/or combined deltas, or respective portions thereof. The deltas and/or combined deltas may, if needed, be reconstituted according to any of the same methods as for the data item. Appropriate updates are then derived from the combined deltas and/or deltas, and applied to the data. The derived updates may comprise data to be added, instructions to remove data, or instructions to change the values of data objects contained in data objects of the data item. These updates are applied to the data in sequential order.

Operation 360 sends the updated data. Sending the updated data refers to any or all of storing the updated data, transmitting the updated data over the network and presenting the updated data on a display. For example, the updated data may be stored in main memory for quick access in future queries, transmitted to a user or a processing server via a local area network or intranet, or presented to a user within a graphical user interface.

Illustration of Deltas and Combined Deltas

Figure 4:
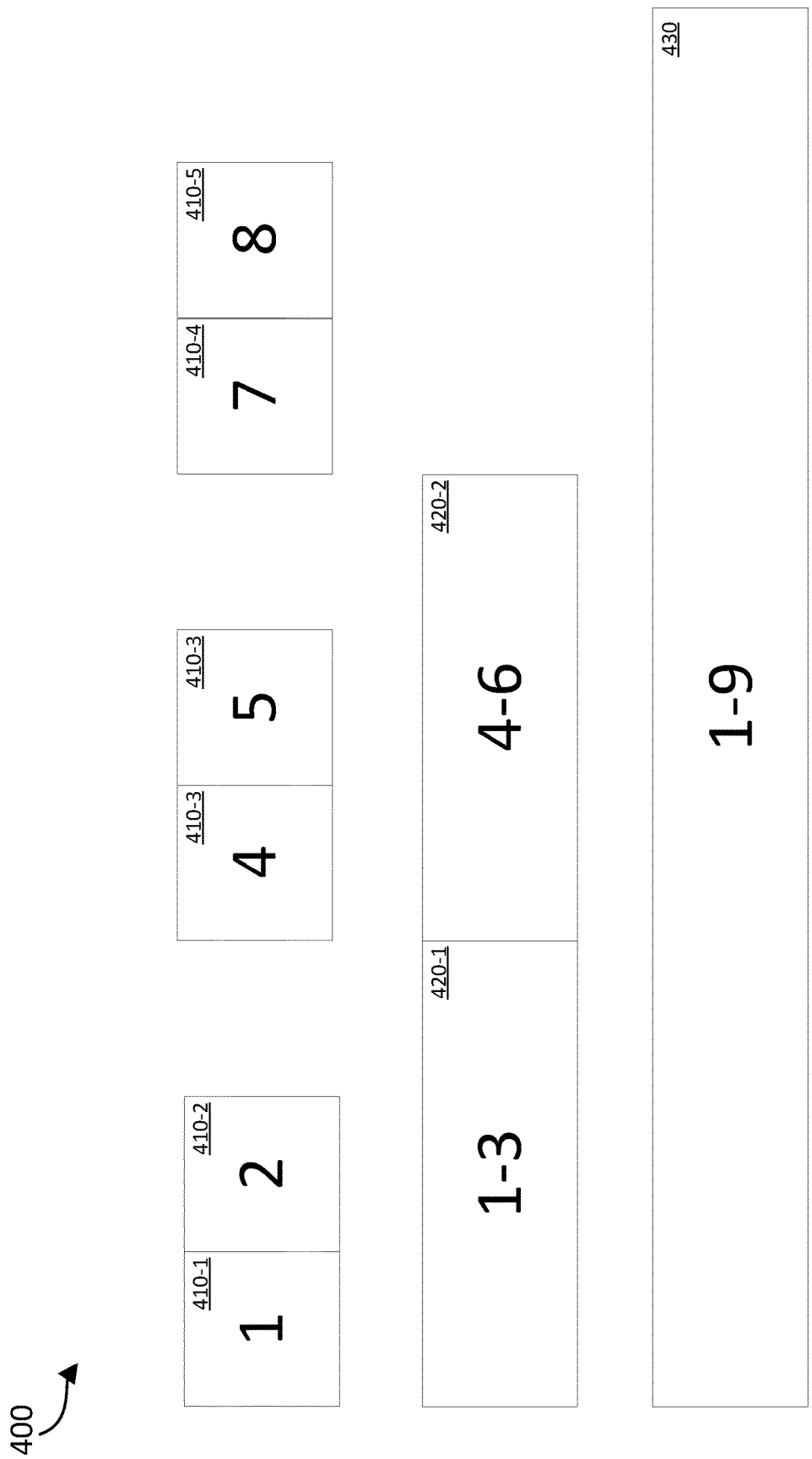
FIG. 4 is a schematic diagram of deltas and combined deltas, in accordance with example embodiments.

Referring now to FIG. 4, it is a schematic diagram that illustrates a set of deltas and combined deltas 400.

Subsets of the set of deltas and/or combined deltas may be used to represent any range of 1 to U updates, where U is less than or equal to 9. The number(s) on each delta and/or combined delta indicate the update or range of updates it represents.

Deltas 410 are individual deltas. Each represents a single update. The deltas may be generated and stored according to any of the methods described above.

Combined deltas 420 are first-level combined deltas. Each represents three updates. Combined delta 420-1 represents updates 1, 2 and 3. Combined delta 420-2 represents updates 4, 5 and 6. The first-level combined deltas may be generated and stored according to any of the methods described above.

Combined delta 430 is a second-level combined delta. Combined delta 430 represents updates 1, 2, 3, 4, 5, 6, 7, 8 and 9. The second-level combined delta may be generated and stored according to any of the methods described above.

Update ranges 1 to U may be represented using subsets of the set of deltas and/or combined deltas with fewer than U elements, excepting the trivial examples of update ranges 1 to 1, and 1 to 2. For example, update range 1 to 7 may be represented using two combined deltas, 420-1 and 420-2, and a delta, 410-4.

Example Data Structure

Figure 5:
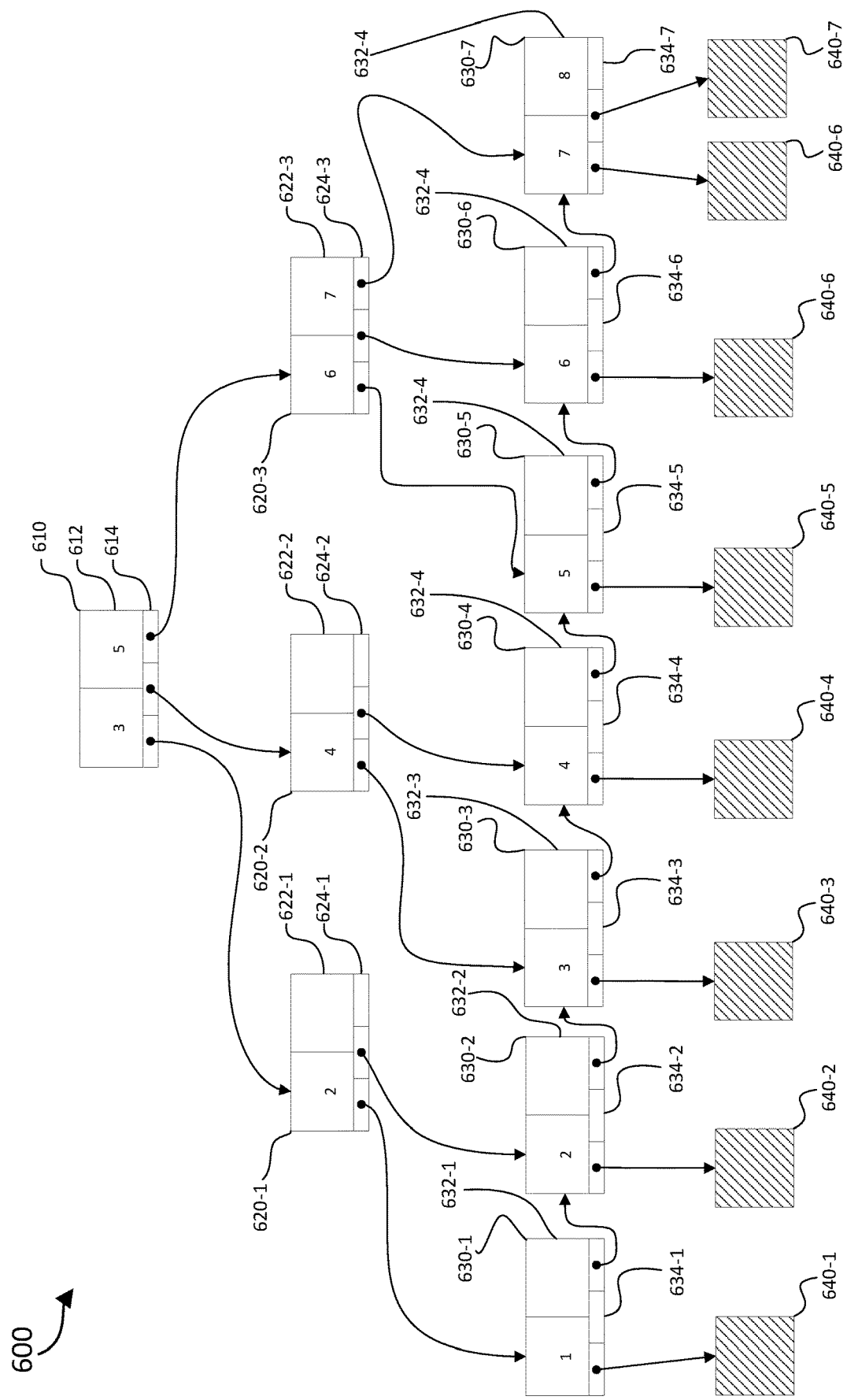
FIG. 5 is a schematic diagram of an example data structure that the data item, deltas and combined deltas may comprise.

Referring now to FIG. 5 it is a schematic diagram that illustrates a B+ tree data structure 600. Where the data and updates represented by the data item, the deltas, and the combined deltas is indexed data, e.g. data containing elements indexed by some identifier, the data item, the deltas and the combined deltas may comprise such a B+ tree data structure.

Using a B+ tree data structure for the data item, deltas and combined deltas enable the respective portions of these to be found, and hence retrieved, quickly. B+ trees enable portions of the data to be found within O(log T) time where, T is the number of nodes, e.g. data objects, represented by the B+ tree data structure. For practical data sizes, the time required to find portions of data is effectively constant. B+ trees are particularly useful for retrieving such portions of data stored on a persistent data store, such as a hard disk drive or solid state drive. This is at least because B+ trees are able to have multiple, typically many, keys at each node and to have multiple, typically many, branches at each level. Using a small number of larger nodes is advantageous as accesses to persistent data storage require a substantial fixed amount of computational resources regardless of the amount of data being stored. The same also applies to accesses over a network, e.g. in a distributed database system. It is, therefore, advantageous to use a small number of large nodes with a greater number of branches to minimize the number of accesses. Other related data structures, such as binary trees, use a larger number of smaller nodes with a small number of branches so are suboptimal for persistent data storage. In embodiments where a token ring distributed database system is used, such as Apache Cassandra, using the B+ tree data structure can be particularly advantageous.

In token ring systems, each element, or row, entered in to the database is assigned a unique hash, where the hash is (pseudo-) random. Each database in the system stores a given range of hashed items. In this way, the elements are distributed evenly across the servers. This means that, provided the elements are of roughly equal size, the computational load on each server should be approximately even, minimizing "hotspotting" of individual servers. However, these elements may be of different sizes in systems having variable sized blocks. If the size of elements differs substantially then a small number of the servers may have a heavy computational load with others being underutilized. In these scenarios, if a required performance standard is to be met, the servers under heavy computational loads may need to be upgraded, which may not have been necessary if the other servers were being effectively utilized. Even if more computational resources were required overall, the above would still be disadvantageous as if certain servers were not under heavy computation loads, additional servers could be added to the system instead of upgrading an existing server. Greater quantities of low-powered commodity servers, each capable of handling a smaller computational load, are typically significantly less expensive than a smaller number of high-powered servers, each capable of handling a larger computational load.

Each of the data items, deltas and combined delta are divided in to fragments. Each of the fragments stores several indexed elements from the given data item, delta or combined delta. The size of each fragment is restricted to a given size limit, where the size limit is set as a number of elements or as a total data volume, e.g. a number of megabytes of data. The size limit is set such that a significant amount of data can be retrieved in a single block, for the reasons cited above, while preventing sizes so great that they lead to a disproportionate computational load on a small number of systems. Each of these fragments is stored as an element, or row, in the distributed database system causing the data to be distributed evenly across the system in fixed-size blocks, as each block is allocated to a server (pseudo-)randomly. So, the computational load across the servers in the distributed database system should be approximately even.

The indexed data located in each fragment can then be located using a B+ tree describing which data is contained in which fragment. When one particular indexed data elements from a given data item, delta or combined delta is required, the B+ tree is searched to find the fragment in which it is contained. The fragment can then be retrieved and the respective data retrieved from it. The data contained within the fragment itself may also be stored as a B+ tree.

The combination of fragmenting the data items, deltas and combined deltas as described and using a B+ tree to locate elements enables data to be evenly distributed across servers while still enabling elements and ranges of elements to be located efficiently.

The illustrated B+ tree data structure 600 is a B+ tree of order 3. The order refers to the maximum number of branches from each node. A B+ tree of order 3 is illustrated for ease of explanation and is intended to be non-limiting. In many embodiments, the B+ tree is of a substantially higher order, e.g. order 100, as higher orders are particularly useful for B+ trees stored in persistent data storage. The illustrated B+ tree 600 also has only 3 levels. This is for ease of explanation and is intended to be non-limiting. In many embodiments, the B+ tree has many such levels. It should be noted that the skilled person would be able to generalize the illustrated data structure to any order and number of levels based on the included description.

Node 610 is the root node of the B+ tree 600. The root node is the node where searches for elements in the tree begin. The root node comprises keys 612 and pointers 614. The keys 612 comprise two keys, 3 and 5, which indicate the elements to which pointers 614 point. The left-most pointer points to nodes in the level below having keys prior to the left key, e.g. less than 3. The middle pointer points to nodes in the level below having keys equal to or greater than the left key but less than the right key, e.g. 3 or 4. The right-most pointer points to nodes in the level below having keys equal to or greater than the second key, e.g. equal to or greater than 5.

Nodes 620 are intermediary nodes of the B+ tree 600. The intermediary nodes 620 each comprise key(s) 622 and pointers 624.

Nodes 620-1 and 620-2 each comprise a single key 622-1, 622-2 and two pointers 624-1, 624-2. For each, the left-most pointer points to nodes in the level below having keys prior to the respective key value 622-1, 622-2, and the middle pointer points to nodes in the level below having keys equal to or greater than the respective key value 622-1, 622-2. Neither of these nodes has a right-most pointer.

Node 620-3 comprises two keys 622-3, 6 and 7, which indicate the elements to which pointers 624-3 point. The left-most pointer points to nodes having keys prior to the left key, e.g. less than 6. The middle pointer points to nodes having keys equal to or greater than the left key but less than the right key, e.g. 6. The right-most pointer points to nodes having keys equal to or greater than the second key, e.g. equal to or greater than 7.

Nodes 630 are leaf nodes of the B+ tree 600. The leaf nodes comprise key(s) 632 and pointers 634. Each leaf node 630 has either one or two keys 632. Each leaf node 630 also has two or three pointers 634. The left-most pointer points to a data block 640 corresponding to the left-most key. If a middle pointer and right key exist for a given leaf node 630, the middle pointer points to the data block 640 for the respective right key. For all leaf nodes 630 except the last leaf node 630-7, there is a right-most pointer which points to the leaf node containing the subsequent key. These pointers enable ranges of subsequent keys to be easily and quickly iterated through.

Data blocks 640 are portions of data pointed to by leaf nodes of the tree 630. The data blocks 640 may be located in main memory and/or in persistent storage. Each data block 640 may be of any suitable type, e.g. a fragment of a data item, delta or combined-delta as described above; a file; a database row or table; an in-memory data structure; binary data; a string or a markup language object.

Example Computing Device

Figure 6:
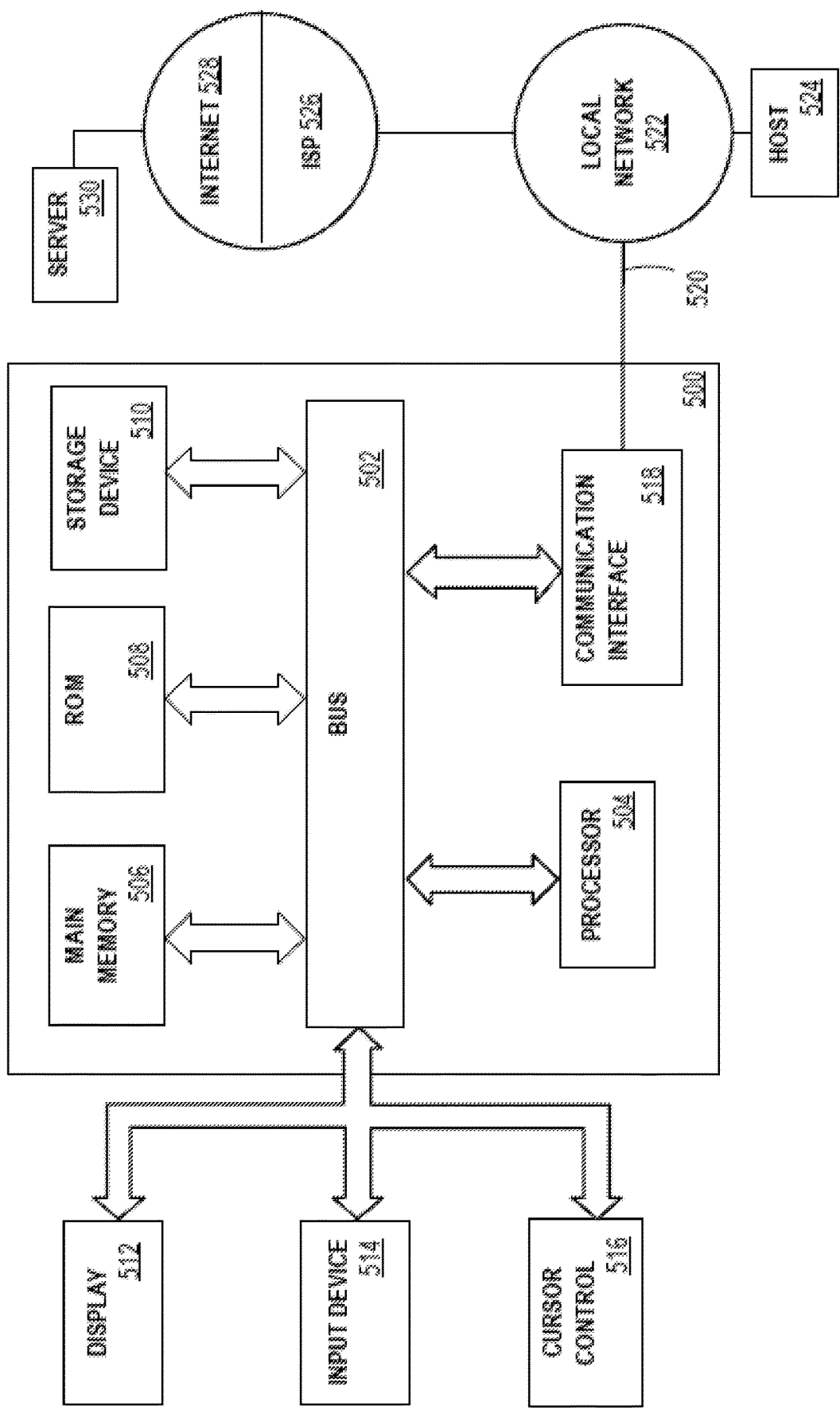
FIG. 6 is a schematic diagram of a computing device in which software-implemented processes of the example embodiments may be embodied.

Referring now to FIG. 6, it is a block diagram that illustrates a computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (e.g., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described example computer hardware is presented for the purpose of illustrating certain underlying computer components that may be employed for implementing the subject innovation. This computer hardware, when executing software that causes the computer hardware to perform the various processes discussed herein, becomes a special purpose computer that performs particular useful applications.

The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

EXTENSIONS AND ALTERNATIVES

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations. A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A computing system comprising:
    a computer processor; and
    a non-transitory computable-readable medium storing software instructions executable by the computer processor to cause the computing system to:
        receive initial data;
        store a data object corresponding to the initial data;
        receive a plurality of updates to the initial data;
        generate corresponding deltas for each of M sequential updates of the plurality of updates, each delta representing an update to a previous state of the data, wherein M is greater than or equal to one;
        generate a first-level combined delta representing N updates of the plurality of updates, wherein N represents the M updates and one or more subsequent updates;
        generate a second-level combined delta representing J updates of the plurality of updates, wherein J represents the N updates and one or more subsequent updates;
        store the deltas as delta data objects, the first-level combined deltas as first level combined delta objects, and the second-level combined deltas as second level delta data objects;
        enable subsequent determination respective states of the data after any specified number of updates by:
        retrieving a data object corresponding to the initial data,
        determining a minimal set of data objects, wherein the minimal set of data objects comprises:
            the second-level combined delta data objects;
            first-level combined delta data objects that represent updates after those represented by the second-level combined delta data objects; and
            any delta data objects not represented by the first-level and the second-level combined delta data objects;
        retrieving the determined minimal set of data objects;
        determining updates to the initial data using the retrieved minimal set of data objects; and
        reconstituting the data using the data object corresponding to the initial data and the updates.

2. The computing system of claim 1, wherein J=I×N, where I is a positive integer greater than one.

3. The computing system of claim 2, wherein the instruction further causes the computing system to generate I−1 first-level combined deltas, each representing a distinct set of N updates of the M updates, and storing the I−1 first-level combined deltas.

4. The computing system of claim 1, wherein each combined delta represents a continuous portion of an ordered sequence of updates.

5. A method, performed by one or more processors, the method comprising:
    receiving initial data;
    storing a data object corresponding to the initial data;
    receiving a plurality of updates to the initial data;
    generating corresponding deltas for each of M sequential updates of the plurality of updates, each delta representing an update to a previous state of the data, wherein M is greater than or equal to one;
    for each sequence of N updates of the plurality of M updates, generating a first-level combined delta representing the N updates;
    for each sequence of J updates, generating a second-level combined delta representing the J updates of the plurality of updates, where J is larger than N;
    storing the deltas as delta data objects, the first-level combined deltas as first level combined delta objects, and the second-level combined deltas as second-level combined delta data objects;
    in response to a request for a current state of the data, retrieving the data object corresponding to the initial data, and determining a minimal set of data objects that represent A updates, wherein the minimal set of data objects comprises:
        the second-level combined delta data objects;
        first-level combined delta data objects that represent updates after those represented by the second-level combined delta data objects; and
        any delta data objects not represented by the first-level and the second-level combined delta data objects;
    retrieving the determined minimal set of data objects; determining updates to the initial data using the retrieved minimal set of data objects; and
    generating updated data using the data object corresponding to the initial data and the determined updates.

6. The method of claim 5, wherein J=I×N, where I is a positive integer greater than one.

7. The method of claim 6, the method comprising generating I−1 first-level combined deltas, each representing a distinct set of N updates of the M updates, and storing the I−1 first-level combined deltas.

8. The method of claim 7, wherein I=N.

9. The method of claim 5, wherein the initial data, the deltas, the first-level combined deltas and the second-level combined deltas each comprise indexed data, wherein indexed data comprises one or more indexed elements.

10. The method of claim 9, wherein the storing of the delta data objects, the first-level combined delta data objects and the second-level combined delta data objects is to a token ring database system, wherein the token ring database system allocates each element stored to the token ring database system to a given database server randomly or pseudo-randomly.

11. The method of claim 10, wherein each of the data object, the delta data objects, the first-level combined delta data objects and the second-level combined delta data objects is divided into a plurality of fragments, wherein each fragment stores several index elements, and each fragment is stored into the token ring database system.

12. The method of claim 11, further comprising, storing a B+ tree usable for locating each indexed data contained in the respective data object, delta or combined delta data objects, in the token ring database system, wherein the B+ tree indicates the fragment in which an indexed element associated with the indexed data is contained.

13. The method of claim 5, wherein each combined delta represents a continuous portion of an ordered sequence of updates.

14. The method of claim 13, the method comprising generating deltas representing each update of a subset of the plurality of updates, wherein the subset of the plurality of updates comprises each update for which the respective update is not the final update of a combined delta.

15. The method of claim 5, wherein an expectancy of number of elements in the minimal set of data objects is O(log B).

16. The method of claim 5, wherein the deltas comprise new data.

17. The method of claim 5, wherein the deltas comprise data changing instructions.

18. The method of claim 5, wherein generating the first-level combined delta comprises generating the first-level combined data when a threshold number of deltas is reached.

19. A method, performed by one or more processors, the method comprising:
   receiving initial data;
   storing a data object corresponding to the initial data;
   receiving a plurality of updates to the initial data;
   for each of M sequential updates of the plurality of updates:
      generating deltas representing an update to a previous state of the data, wherein M is greater than or equal to one;
      for each sequence of N updates of the plurality of updates, generating a first-level combined delta representing the N updates;
      for each sequence of J updates, generating a second-level combined delta representing the J updates of the plurality of updates, where J is larger than N ;
   storing the deltas as delta data objects, first-level combined deltas as first level combined delta objects, and second-level combined deltas as second-level combined delta data objects;
   in response to a request for a current state of the data after A updates, retrieving the data object corresponding to the initial data and determining a minimal set of delta data objects that represent the A updates by:
      determining a highest combined delta level comprising combined delta data objects that represent less than A updates;
      selecting combined delta data objects of the highest combined delta level;
      selecting combined delta data objects of a second highest combined delta level below which represent updates after those represented by the highest combined delta level;
      selecting combined delta data objects, if any, which represent updates after those represented by the second highest combined delta level but before and up to A updates in turn for each lower level of combined deltas until the lowest combined delta level is reached; and
      selecting delta data objects before and up to a delta associated with A updates for updates not represented by a delta data object at any level;
   retrieving the minimal set of delta data objects;
   determining updates to the initial data using the retrieved minimal set of delta data objects; and
   generating updated data using the data object corresponding to the initial data and the determined updates.

* * * * *